(12) United States Patent
Zimring et al.

(10) Patent No.: US 11,394,760 B2
(45) Date of Patent: Jul. 19, 2022

(54) INDEPENDENT CONTROL OF INTERACTIVE STREAMING MEDIA

(71) Applicant: GOOGLE LLC, Mountain View, CA (US)

(72) Inventors: Dov Shimon Zimring, Belmont, CA (US); Ali Naddaf, Cupertino, CA (US); Michael Jon Sundermeyer, Palo Alto, CA (US); Rishi Chandra, Los Altos, CA (US); John Affaki, Los Altos, CA (US); Sarah Walter, Novato, CA (US); Rob McCool, Menlo Park, CA (US); Majd Bakar, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 17/302,053

(22) Filed: Apr. 22, 2021

(65) Prior Publication Data
US 2021/0243239 A1    Aug. 5, 2021

Related U.S. Application Data

(62) Division of application No. 16/175,195, filed on Oct. 30, 2018, now Pat. No. 11,019,122, which is a
(Continued)

(51) Int. Cl.
*G06F 15/16*      (2006.01)
*H04L 65/612*     (2022.01)
(Continued)

(52) U.S. Cl.
CPC .......... *H04L 65/4084* (2013.01); *A63F 13/23* (2014.09); *A63F 13/26* (2014.09);
(Continued)

(58) Field of Classification Search
CPC . H04L 65/4084; H04L 67/38; H04L 65/4092; H04L 65/602; H04L 29/06034;
(Continued)

(56) References Cited

U.S. PATENT DOCUMENTS 6,754,907 B1    6/2004  Schumacher et al.
8,646,012 B2    2/2014  Rouse et al.
(Continued)

FOREIGN PATENT DOCUMENTS

CN    102428703 A    4/2012
CN    104144145 A    11/2014
(Continued)

OTHER PUBLICATIONS

U.S. Appl. No. 16/175,195, filed Oct. 30, 2018.
(Continued)

*Primary Examiner* — Phuoc H Nguyen
(74) *Attorney, Agent, or Firm* — Brake Hughes Bellermann LLP

(57) ABSTRACT

In one general aspect, a method can include receiving, at a server computing device, a launch request to launch and stream media content pertaining to a game session, the launch request being provided by a mobile device, selecting, using the launch request, a media host configured to stream the media content, verifying a user associated with the mobile device and launching the game session for streaming to the user on a device other than the mobile device. In addition, the method can include during the game session and while streaming the media content, receiving a plurality of real time control requests from the mobile device, and executing the control request by compositing, in real time, the at least one change and the media content and to produce
(Continued)

a composite display and transmitting, to the device other than the mobile device, the encoded composite display for streaming in real time.

12 Claims, 6 Drawing Sheets

Related U.S. Application Data division of application No. 14/810,994, filed on Jul. 28, 2015, now Pat. No. 10,135,892.

(51) Int. Cl.
| | |
|---|---|
| A63F 13/428 | (2014.01) |
| A63F 13/26 | (2014.01) |
| A63F 13/23 | (2014.01) |
| A63F 13/355 | (2014.01) |
| A63F 13/335 | (2014.01) |
| A63F 13/79 | (2014.01) |
| A63F 13/352 | (2014.01) |
| H04L 65/613 | (2022.01) |
| H04L 65/60 | (2022.01) |
| H04L 67/131 | (2022.01) |

(52) U.S. Cl.
CPC .......... *A63F 13/335* (2014.09); *A63F 13/352* (2014.09); *A63F 13/355* (2014.09); *A63F 13/428* (2014.09); *A63F 13/79* (2014.09); *H04L 29/06034* (2013.01); *H04L 65/4092* (2013.01); *H04L 65/602* (2013.01); *H04L 67/38* (2013.01)

(58) Field of Classification Search
CPC ........ A63F 13/428; A63F 13/26; A63F 13/23; A63F 13/355; A63F 13/335; A63F 13/79; A63F 13/352; A63F 13/42; A63F 13/358
See application file for complete search history.

(56) References Cited

U.S. PATENT DOCUMENTS

| | | | |
|---|---|---|---|
| 8,858,333 B2 | 10/2014 | Vange | |
| 8,881,205 B2 | 11/2014 | Friedman | |
| 9,001,178 B1 | 4/2015 | Leske et al. | |
| 2006/0281413 A1 | 12/2006 | Burbidge et al. | |
| 2009/0157797 A1 | 6/2009 | Chang et al. | |
| 2011/0142034 A1 | 6/2011 | Wu et al. | |
| 2012/0094757 A1 | 4/2012 | Vago et al. | |
| 2012/0270576 A1* | 10/2012 | Herrington | H04N 21/43637 455/466 |
| 2013/0307792 A1 | 11/2013 | Andres et al. | |
| 2014/0024447 A1 | 1/2014 | Le et al. | |
| 2014/0137160 A1* | 5/2014 | Perlman | H04N 21/234309 725/59 |
| 2014/0179428 A1 | 6/2014 | Miura et al. | |
| 2014/0187318 A1 | 7/2014 | Gallizzi et al. | |
| 2014/0208400 A1 | 7/2014 | Henshaw et al. | |
| 2014/0243086 A1 | 8/2014 | Yang et al. | |
| 2014/0274384 A1 | 9/2014 | Boswell et al. | |
| 2014/0277850 A1 | 9/2014 | Jobs et al. | |
| 2015/0078388 A1 | 3/2015 | Puram et al. | |
| 2015/0088972 A1 | 3/2015 | Fullagar et al. | |
| 2015/0177938 A1 | 6/2015 | Kleinpeter et al. | |
| 2015/0331488 A1 | 11/2015 | Ullrich et al. | |
| 2016/0165663 A1 | 6/2016 | Shanmugam et al. | |
| 2016/0189543 A1 | 6/2016 | Altintas et al. | |
| 2016/0266669 A1 | 9/2016 | Sakthivel et al. | |

FOREIGN PATENT DOCUMENTS

| | | |
|---|---|---|
| CN | 104202417 A | 12/2014 |
| CN | 104468502 A | 3/2015 |
| EP | 2261809 A1 | 12/2010 |
| WO | 2013126507 A1 | 8/2013 |
| WO | 2014085714 A1 | 6/2014 |

OTHER PUBLICATIONS

U.S. Appl. No. 14/810,994, filed Jul. 28, 2015.
Extended European Search Report for European Application No. 20185541.8, dated Sep. 14, 2020, 12 pages.
International Preliminary Report on Patentability for PCT Application PCT/US2016/044249, dated Feb. 8, 2018, 14 pages.
International Search Report and Written Opinion for PCT Apn. PCT/US2016/44249, dated Jan. 5, 2017, 20 pages.
Invitation to Pay Additional Fees and Partial Search Report for PCT Apn. PCT/US2016/44249, dated Nov. 8, 2016, 6 pages.

* cited by examiner

INDEPENDENT CONTROL OF INTERACTIVE STREAMING MEDIA

CROSS-REFERENCE TO RELATED APPLICATION

This application is a Divisional of U.S. application Ser. No. 16/175,195, filed Oct. 30, 2018, which is a Divisional of U.S. application Ser. No. 14/810,994, filed on Jul. 28, 2015, the disclosures of which are incorporated herein by reference in their entireties.

TECHNICAL FIELD

This description generally relates to interactive streaming media. In particular, this description relates to the use of computing devices for interactive gaming.

BACKGROUND

Streaming media refers to content, typically audio, video, or both, that is intended to be rendered to an end-user as it is transmitted from a content provider. Because the content is being viewed in real-time, a continuous and uninterrupted stream of content is desired. The extent to which a user perceives an uninterrupted stream that displays uncorrupted media is referred to as the Quality of Service (i.e., QOS) of a system.

SUMMARY

In one general aspect, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of controlling interactive streaming media, the method including receiving, at a server computing device, a launch request to launch and stream media content pertaining to a game session, the launch request being provided by a mobile device. The method also includes selecting, at the server computing device and using the launch request, a media host configured to stream the media content and verifying a user associated with the mobile device and launching the game session for streaming to the user on a device other than the mobile device. The method also includes, during the game session and while streaming the media content, receiving a plurality of real time control requests from the mobile device, the requests configured to generate at least one change in the media content, and upon receiving each control request, the method includes executing the control request by compositing, in real time, the at least one change and the media content and to produce a composite display and encoding the composite display for transmission to the device other than the mobile device. The method further includes transmitting, to the device other than the mobile device, the encoded composite display for streaming in real time. Other embodiments of this aspect include corresponding computer systems, apparatus, and computer programs recorded on one or more computer storage devices, each configured to perform the actions of the methods.

In another general aspect, a system can be configured to include a media player including audio video streaming circuitry, the media player coupled to a network and a display device and configured to receive streaming content from a content server computing device. The system can also be configured to include a mobile device configured to determine that the mobile device is proximate to a controller and wirelessly connect to the controller. The mobile device can be configured to receive a list of a plurality of content server computing devices that stream content, and select at least one content server to host a streaming session. The mobile device can also be configured to establish a streaming session with the at least one content server and relay a representation of input received from the controller to the at least one content server computing device. The representation may be generated by the mobile device and include a plurality of redundant packets representing a command to control interactive streaming media content provided by the at least one content server computing system. Other embodiments of this aspect include corresponding computer systems, apparatus, and computer programs recorded on one or more computer storage devices, each configured to perform the actions of the methods.

Another general aspect includes a method for sending, from a server computing system to the mobile device, a port identifier for communicating data over a network in response to receiving a streaming session request from a mobile device. The method also includes receiving, at the server computing system, a plurality of redundant sets of data representing a request to modify streaming media content. Each set can be identified by an identical sequence identifier. The method also includes executing the request to modify streaming media content in real time and notifying the mobile device about the execution, and discarding other redundant sets of data having the identical sequence identifier. Other embodiments of this aspect include corresponding computer systems, apparatus, and computer programs recorded on one or more computer storage devices, each configured to perform the actions of the methods.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
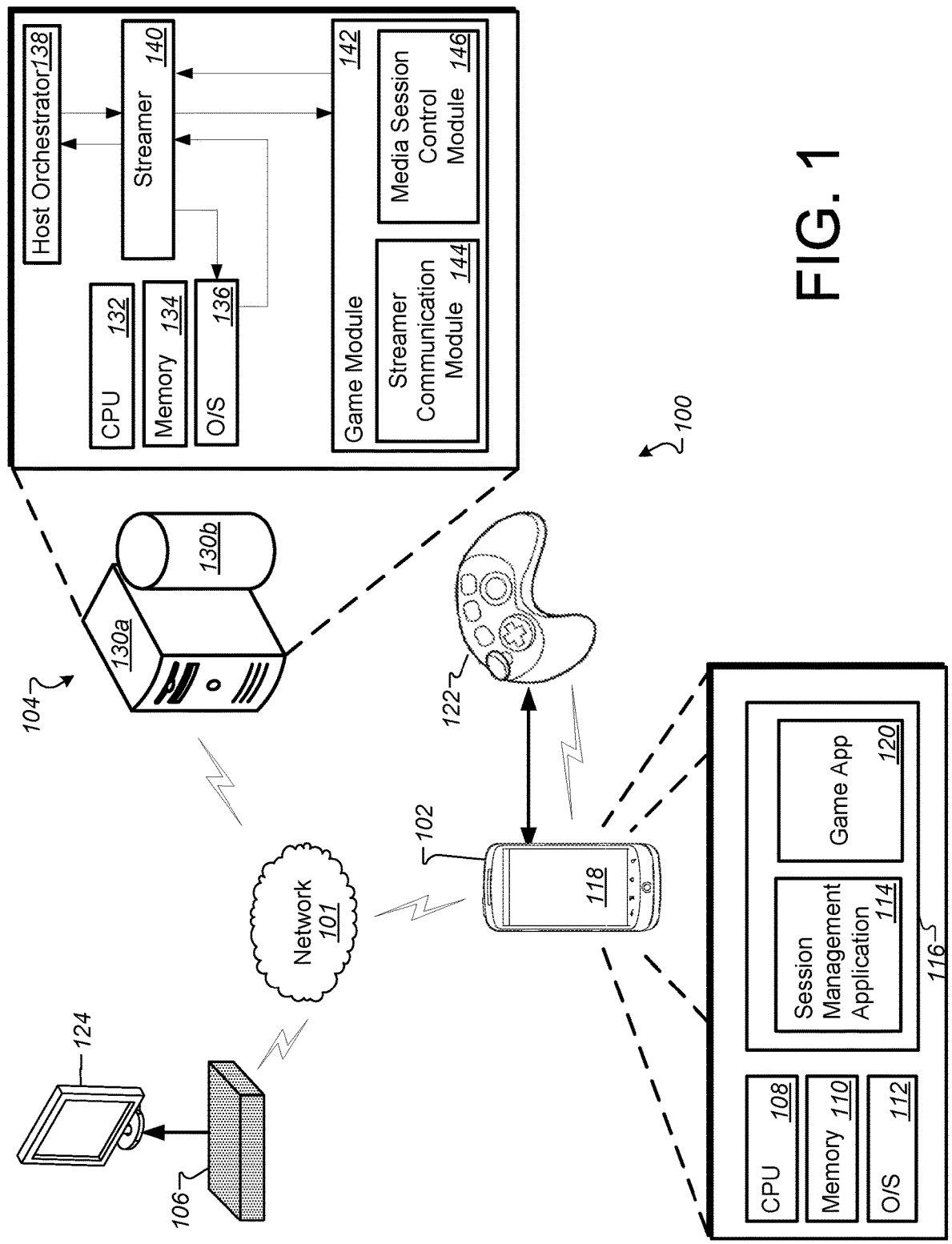
FIG. 1 is a block diagram of an example system that can be used for independent control of interactive streaming media.

Interactive streaming media content can generally be provided using combinations of one or more servers handling processing, encoding, and streaming of media content, and a media player receiving and decoding the media content received from the one or more servers. Consumers of the media content can interact with the media content by manipulating one or more controllers or computing devices to control and/or modify the streaming media content. The consumers of the media may be interacting with the one or more servers in real time. For example, interactions in real time may pertain to processing interactions that occur within a few hundred milliseconds of receiving data input so that the feedback is available, for a user, nearly immediately.

The systems and methods described in this disclosure can be used to independently control interactive streaming media sessions and content as well as manage user interactions with such sessions and content. Implementations may include enabling a user to interact with media content received at a media player, from one or more servers, and without the media player receiving user input and without the media player requesting the media content. In this implementation, user controls, actions, and/or requests may be received at a mobile device and may originate from a controller device (paired or coupled to a mobile device). The mobile device can send any received user controls, actions, and/or requests to a server device, which in response, can provide media content and updated/modified media content to the media player for display on a connected display device.

In general, user commands can be inputted at a controller coupled to a mobile device. The commands can be detected by the mobile device and can be sent to one or more servers in near real time or in real time. The mobile device may function as a go-between for a controller and the one or more servers. The mobile device may be configured to send any user inputs (received at the controller) to one or more servers. The one or more servers can respond by modifying the streaming content to execute commands that the user is requesting. This communication between the one or more servers and the mobile device can continue in a back and forth manner based on input provided by a user, at the controller.

In the following examples, the media player described may be configured as a simple video decoding device. That is, the media player may not include additional communication/radio circuitry, or physical interfaces for accepting human input. The media player described below may be connected to a display device and the Internet and may receive streaming media content from a remote server device via the Internet.

In one non-limiting example, a mobile device can establish a streaming session in a cloud-based gaming environment. Establishing a streaming session can include notifying the media player about one or more servers to which a session may be established. In addition, establishing a streaming session can include linking with and accepting user-input peripheral signals (i.e., controller signals) and sending received user-input peripheral signals (i.e., controller signals) to the one or more servers to which a session may be established. In general, the above steps can be performed at a speed enabling the user to experience real time interactivity with the media content streamed from a media player and displayed on a display device.

In some implementations, a user can access streaming media (e.g., an online game, video, application, etc.) on her display device (e.g., a television) through a media player connected to the display device and the Internet. The user may have paired or connected a game controller and a mobile device (or mobile phone, tablet computer, for example). The mobile device may be connected to one or more remote servers via the Internet, for example. The user can access an application on her Internet-connected mobile device, establish a session with one or more remote servers to initiate streaming media based on a selected game. Once the session is established, the user may put away her mobile device and pick up the game controller (paired/connected to her mobile device) and begin playing the game over the streaming media session. User interactions or commands received at the controller can be inserted and/or carried out within streaming media by passing the interactions or commands to the mobile device (from the controller), having the mobile device pass the interactions or commands along to the one or more servers and having the one or more servers carry out the commands by performing the commands and streaming the resulting completed commands into the game streaming from media player.

FIG. 1 is a block diagram of an example system 100 that can be used for streaming media content. The example system 100 includes a plurality of computing devices that can exchange data over a network 101. The devices may include a mobile device 102, a server computing device 104, and a media player 106. Additional devices are possible and such devices may be configured to be substituted for one another, as described below. In some implementations, the devices 102, 104, and 106 can be laptop or desktop computers, smartphones, personal digital assistants, portable media players, tablet computers, or other appropriate computing devices that can communicate, using the network 101, with other computing devices or computer systems.

Mobile device 102 is represented here as a smart phone. In some implementations, the device 102 may be a laptop computer, a notebook computer, a tablet computer, a wearable computing device (e.g., a watch), or another type of mobile computing device. The example mobile device 102 can include one or more processors (e.g., client central processing unit (CPU) 108) and one or more memory devices (e.g., client memory 110)). The mobile device 102 can execute a client operating system (O/S) 112 and one or more client applications (e.g., a session management application 114, Game App 120) that can display a user interface (UI) (e.g., UI 116) on a display device 118 included in the mobile device 102.

Mobile device 102 can include an application 120, shown here as "GAME APP," which can be used to assist a user in configuring interactive media streaming. In particular, the application 120 can be used by a user to select a game from a catalog of games offered via the application 120. The application 120 can additionally be used to configure pairing or connection with one or more controllers 122 and/or connection to server computing device 104 in combination with session management application 114.

The session management application 114 can be used by a user of mobile device 102, for example, to establish a gaming session between mobile device 102 and server computing device 104. For example, session management application 114 can be configured to arrange a connection to one or more servers (including server computing device 104), and can link one or more peripheral devices, such as gaming device/controller 122, to server computing device 104 over network 101 and via mobile device 102. The link between mobile device 102 and controller 122 may be wired or wireless.

Session management application 114 can be configured to send any received user-input signals (i.e., received from controller 122) to server computing device 104 via mobile device 102. In general, the session management application 114 can connect mobile device 102 and server computing device 104, maintain the connection, and provide any received signals or user requests to server computing device 104. Server computing device 104 can provide the signals or requests as streaming output to media player 106 for display on display device 124. The signals and/or requests can be transmitted between the devices in system 100 so as to enable a user to experience real time interactivity with media content provided to media player 106 (from server computing device 104) and on display device 124.

The controller 122 can include a number of user input devices. For example, controller 122 may be a gamepad, a keyboard, a mouse, a game controller, a joystick, a touch screen, a dance pad, a steering wheel, a video game controller, or any combination thereof. In some implementations, the controller may be another mobile device, such as a smart phone or tablet device. The controller 122 is generally connectable to an end user device (such as a mobile device 102, mobile phone, tablet, laptop, etc.). Connection from controller 122 to the end user device can include, but is not limited to Bluetooth, Bluetooth Low Energy (Bluetooth LE), USB, WiFi, or simply physically wired to a supported input port on the end user device. In general, the end user devices (i.e., mobile device 102 controller 122) include an input handler that can relay user input from the device 102 to a remote streamer that ultimately can provide the information to a target game/game session. Game content and the user input can be streamed in real time by media player 106, for example As shown in FIG. 1, the system 100 includes the server computing device 104, which can include one or more computing devices (e.g., server 130a) and one or more computer-readable storage devices (e.g., database 130b). The server 130a can include one or more processors (e.g., server CPU 132), and one or more memory devices (e.g., server memory 134). The computing devices 102 and 106 can communicate with the server computing device 104 (and the server computing device 104 can communicate with the computing devices 102 and 106) using the network 101. The server 130a can execute a server O/S 136.

In some implementations, the server computing device 104 may function as a global orchestrator for gaming sessions used by devices 102 or 106. For example, upon receiving a game launch request from a user, the server computing device 104 may verify user authorization for launching the requested game.

As shown, the server computing device 104 includes a host orchestrator 138, a streamer 140, and game module 142. The host orchestrator 138 represents a module that can select one or more hosts for providing a particular gaming session. Selection can be based on one or more signals including, but not limited to, a geographic location of the user of geographic distance of a host server to a user, GPS, satellite, or cellular signal strength or infrastructure distance from the user, media provider, and/or game provider.

The streamer 140 represents a set of processors that can stream media content using devices shown in system 100. The streamer 140 may be executed on the server computing device 104 alongside any executable games from game module 142. In particular, the streamer 140 can capture, encode and transport game screens to a client device (e.g., mobile device 102) and can inject input commands received from device 102 into the game (i.e., via streaming video/audio).

The streamer 140 may execute streaming tasks using graphics processing units (GPUs) on server computing device 104. The streaming tasks may include providing live streamed graphic intensive games or other media to consumer devices, such as mobile device 102, media player 106, or other device in system 100. In general, the streamer 140 can be streamed over network 101 and provide low latency when carrying out user requests/commands to interact with the media content. For example, low latency may include a streaming latency of less than about 100 to about 120 milliseconds between receiving a user's command at the controller 122 and having an action in response to the command be rendered on the device 124 and can include limited buffering to accomplish such a rate. In general, the streamer 140 streams media content from server computing device 104, and server computing device 104 may be configured with network ports that are not blocked by a firewall or hidden behind any network address translation tasks. In general, the streamer 140 can begin streaming content upon receiving a request to do so from a client device, such as mobile device 102.

In some implementations, the streamer 140 can adapt to different network conditions to select an appropriate streaming configuration. In addition, the streamer 140 can detect, at runtime, a network condition change and react to modify network settings or streaming settings according to detected changes, for example.

The game module 142 represents a number of media-based games (e.g., interactive media/video games) that can be accessed, executed, and streamed by client devices, such as mobile device 102. The game module 142 includes a streamer communication module 144 and a media session control module 146. The streamer communication module 144 can receive commands from a client device (e.g., mobile device 102) and can inject the received commands to control features in a game. The media session control module 146 can receive client session requests from mobile device 102, for example, and can host a media streaming session. For example, a media session control module 146 can provide a media signaling channel between the game module 142 and the mobile device 102.

The system 100 includes the media player 106. The media player 106 may be configured to stream media content and display such streamed media content on a television, computer, or other connected display device. In general, the media content streamed by media player 106 is received over the Internet via network 101, for example. Implementations of system 100 include enabling a user to interact with media that a media player 106 receives without the player having to have any input, decoding, or control capabilities. In this implementation, the user controls, actions, and/or requests are received from a controller device (such as controller 122 that is in communication with mobile device 102) and delivered directly to the server computing device 104 from the mobile device 102, rather than the media player 106. The server computing device 104 can provide the communicated user controls, actions, and/or requests to the media player 106 as updated streaming media content, for example.

Implementations of media player 106 may include a network connection and a video decoder to decode and stream audio and video signals received over the Internet. The media player 106 may simply perform decoding and display of such signals received from an online server, for example. That is, the media player 106 may be configured to communicate with an Internet provider and a media server (e.g., server 104) and as such, any direction for modifying content outputted by the media player 106 may be provided by the Internet provider (for accessing Internet data) and the media server (for accessing media and carrying out user provided requests). In some implementations, the media player 106 may be configured as a receiver only with respect to online data. For example, outside of acknowledgments to server 106 that commands or content have been received and/or performed, the media player may not provide communications to any other device and accordingly may have use for communication radios or physical interfaces or controls for accepting human input. Such an implementation may ensure that any user input commands and session establishment commands are sent to the server computing device 104 via the mobile device 102. In addition, any decoding accomplished between the streaming content and the user's input may be performed by the mobile device 102. The media player 106 may receive an indication from a server to access source content from a particular media content provider.

In some implementations, the network 101 can be a public communications network (e.g., the Internet, cellular data network, dialup modems over a telephone network) or a private communications network (e.g., private LAN, leased lines). In some implementations, the computing devices 102, 104, and 106 can communicate with the network 101 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

In some implementations, the server computing device 104 can represent more than one computing device working together to perform server-side operations. For example, though not shown in FIG. 1, the system 100 can include a computer system that includes multiple servers (computing devices) working together to perform server-side operations. In this example, a single proprietor can provide the multiple servers. In some cases, the one or more of the multiple servers can provide other functionalities for the proprietor. In a non-limiting example, the computer system can also include a search server and a web crawler server.

In some implementations, the mobile device 102 can engage the operating system 112 to execute the session management application 114. The session management application 114 can be configured to contact the server computing device 104 to retrieve content requested by the mobile device 102. For example, mobile device 102 can request a gaming session to begin a new game with game content. The server computing device 104 can receive the request at the game module 142 and begin streaming game content on media player 106 using streamer 140, media session control module 146, and streamer communication module 144. The game content can be streamed over the Internet, for example via network 101, and the user can interact with the content using mobile device 102 and controller 122. In general, the interactions flow from the mobile device 102 (originating either from device 102 or from the controller 122) and are sent to server computing device 104. The server computing device 104 can provide initial gaming content as well as updates to gaming content to media player 106, for example, as server computing device 104 receives updates or commands from device 102 (or controller 122 via device 102).

In one non-limiting example, the user can control gaming content, and interactions with such content, by sending commands using controller 122. Controller 122 can communicate the commands to the mobile device 102. Mobile device 102 can send the commands to server computing device 104, where game module 142 can implement the commands to provide updated game content to media player 106 for display on a television, for example. In short, a user of the mobile device 102 can interact (indirectly via mobile device 102) with the session management application 114 to provide input to, or otherwise control the operation of, the session management application 114 and content being displayed with media player 106.

In some implementations, the mobile device 102 may be connected to controller 122 via a wired or wired connection. For example, the mobile device 102 can communicate directly with the controller 122 using, for example one or more high-speed wired and/or wireless communications protocols, such as Bluetooth, Bluetooth Low Energy (Bluetooth LE), and WiFi. The mobile device 102 can, for example, use the direct communication to identify one or more computing devices that are in proximity to itself and can instigate one or more sessions between the device 102 and controller 122 and/or sessions between controller 122 and server computing device 104. In these implementations, identifying the one or more computing devices that are proximate to the mobile device 102 includes determining that the one or more computing devices are within a communication range of the communication protocol.

Figure 2:
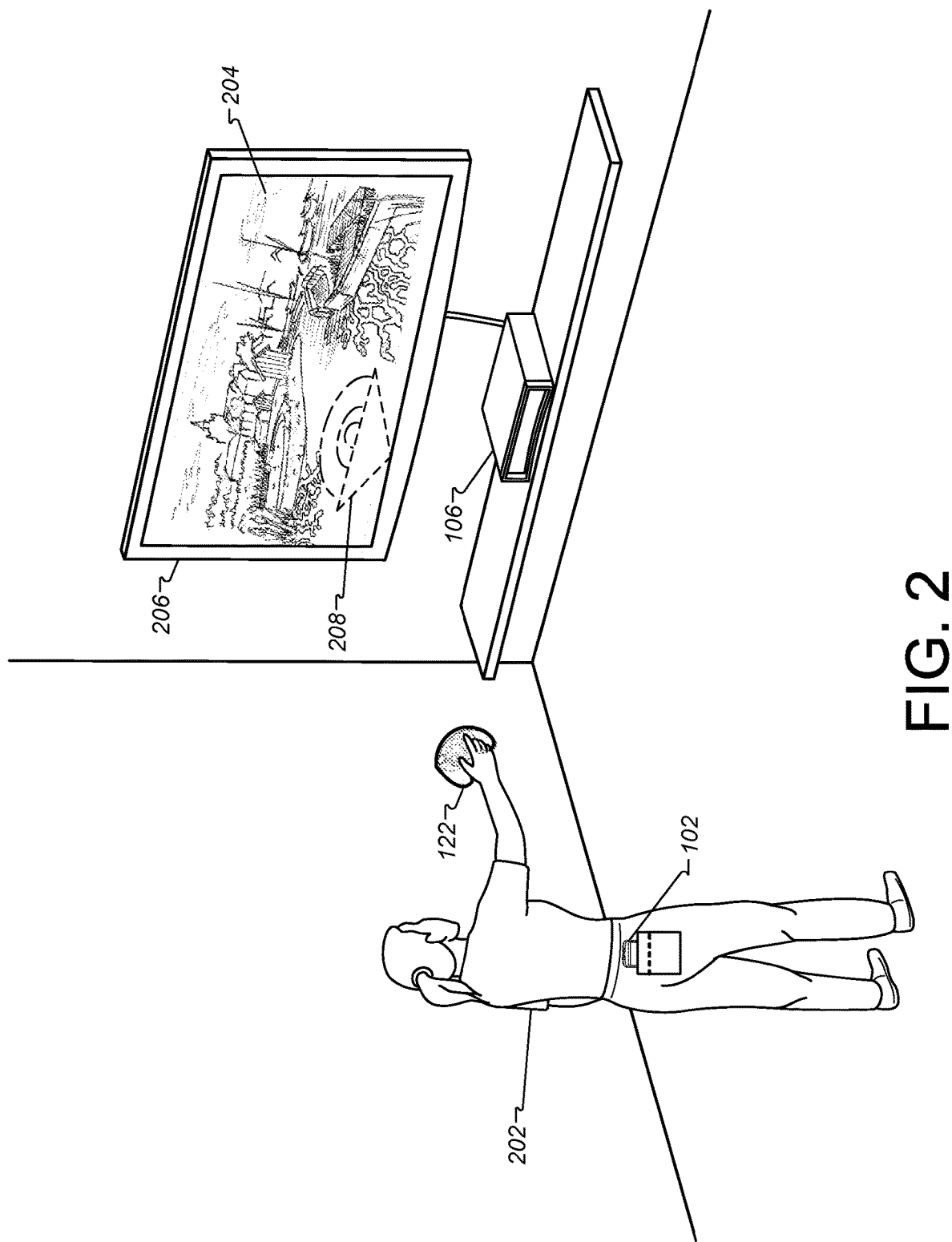
FIG. 2 is a diagram of a user interacting with example systems described in this disclosure.

FIG. 2 is a diagram of a user interacting with example systems described in this disclosure. As shown, a user 202 is interacting with media content 204 streamed from a server (FIG. 1) via media player 106 on display (e.g., television) 206. Here, the media player 106 may be physically connected (wired or wireless) to the television 204 and communicating over the Internet to one or more servers (FIG. 1). The user 202 may have her mobile device 102 on her person or around within range of her game controller 122, for example. In some implementations, the mobile device 102 may be a smart phone, a laptop, a tablet, or other computing device connectable and communicating over the Internet with the one or more servers (FIG. 1). The controller may include a gamepad or other input device that can be connected (wired or wireless) to the mobile device 102, as described in detail above.

In this example, the controller 122 may be connected to and interacting with the mobile device 102 and may not be connected or communicating with the media player 106, servers, displays, or other devices proximate to the controller 122. The controller may function to interact with the mobile device 102 and the mobile device 102 may be configured to join controllers into a gaming session so each controller input can be funneled via mobile device 102 to a server hosting a cloud gaming session, for example.

The mobile device 102 may include an application (e.g., application 120 in FIG. 1) that provides assistance to the user 202, for example, to configure the controller 122, and select and launch games/gaming sessions. For example, the mobile device 102 can configure a gaming session for the user 202 and upon configuring such a session, the application on the mobile device 102 can present a catalog of games for user selection. The user can then select a game for play. Once a controller is configured and a game is selected the mobile device 102 can begin receiving controller inputs and funneling such inputs to a server computing device 104 for processing, execution, and insertion into streaming media content 204.

In the depicted example in FIG. 2, the user 202 is interacting with streaming media content 204 using controller 122. Input entered by the user 202 on controller 122 may be session controlled by mobile device 102. That is, controller 122 may be coupled or otherwise in communication with device 102 and each entry made by the user 202 can be received at the mobile device 102 and sent to a server for entry into the media content 204. In this example environment, the controller 122 is configured to control a path that the user is taking in a scene depicted by media content 204, here shown as a target and range guide 208. In this example, the media content 204 may be providing the user with an interactive gaming environment in which to engage in a gaming session.

In one example, the user can use controller 122 to interact with the streaming media content 204 to move around within the content and/or manipulate range guide 208. In particular, the user can tilt, twist or manipulate controls on controller 122 to cause a user represented by range guide 208 to tilt, twist, turn or otherwise move and change directions of the guide 208. The manipulation of controller 122 can instigate changes to media content by having the user interact with different portions of content 204 or by the user simply moving around within different areas of media content 204 using controller 122. The changes that the viewer encounters in media content 204 can occur in real time as the controller commands issued by the user can be detected by mobile device 102 and sent to a server (e.g., server computing device 104 in FIG. 1) for processing, execution, and relay of any update to media player 106, for example. In general, the real time aspect is possible because mobile device 102 is overseeing the gaming session by connecting controller inputs to media content and game functionality hosted on the server. In general, the mobile device 102 can function to send and receive game (media) content and communication packets to and from servers hosting streaming media content.

In some implementations, input to the controller can be indicated by a particular amount of torque or button press or twist. Such movements may represented by partial turns of a dial (i.e., shallow turns) or multiple turns of a dial (i.e., deep turns). These movements can be inferred by mobile device 102 as shallow turns, deep turns, partial turns, tilted turns, etc. (and can be transmitted to a server computing device 104 accordingly, for example). The deep turn or shallow turn command may be represented by an amount of pressure or torque placed on a button or knob of the controller 122, but to the mobile device 102 and ultimately the game streaming from server computing device 104, the commands can be interpreted and carried out as the user-intended deep or shallow turns within a gaming environment, for example. That is, instead of a digital-like commands (e.g., on or off, left or right, play or stop, etc.), the commands can be represented by system 100 as analog-like commands in which the user 202 may indicate a degree of a command (e.g., movement, selection, etc.) by partially manipulating a button or knob, rather than fully engaging the button or knob.

In a similar fashion, the user 202 can provide an input command with the controller 122 (and to the mobile device 102) to perform a deep right turn (e.g., 120-160 degree turn) by turning a control knob from a starting position rightward to about 120 degrees to indicate to the server that the user intended to perform the right turn command at an angle greater than 90 degrees. The server computing device 104 can carry out the intent of the user because mobile device 102 can detect the subtle difference in controller manipulations and can request that server computing device 104, for example, perform the deep right turn based on received requests from device 102. The deep right turn can be performed and the server computing device 104 can provide the user with a view of such a turn in the streaming media at media player 106 in real time. Similarly, if the user would want to perform a high jump, the user can select a button and depress the button a certain amount to indicate to mobile device 102 (and server computing device 104) which kind of jump is desired.

In the above examples, the speed at which a user selects the button, turns a dial, moves the control, etc. can indicate a threshold for which kind of turn or jump to perform. For example, if the user slowly turns a dial to make a left turn, the user may simply wish to veer slightly leftward ahead and the server can do so upon receiving the user's command. Similarly, if the user wishes to perform a squat to hide from another player (e.g., hide a representation of himself in the media content from another player in the media content), for example, the user can quickly squat or quickly move a controller (or controller button) from an up to a down position in the air. The user speed when inputting a control request (or angle/distance of twisting a control knob) can indicate an instruction for carrying out a distance or quickness associated with a movement. That is, in addition to the instruction to carry out the squat, the speed at which the user squatted (or the amount in which the user turned a control to perform the squat) can be considered part of the request to perform the control (e.g., squat) with a particular vigor. As such, a motion that is quickly performed (or a control knob that is twisted beyond about a 90 degree turn) can indicate to the server a request to perform the movement at a faster pace or for a longer time period based on the user's quickly carried out gesture.

In a non-limiting example, chords of control motions can be used in the systems and methods described herein. For example, a video game may be configured with a selectable lever (e.g., range selector) that can be used to control the speed of the user's walk. In this example, moving the lever an additional length forward or backward causes the in-game rendered character to run or walk slower, respectively. In another non-limiting example, a video game may be configured with a second lever or button that can be used to control a user's standing height. Moving this lever downward slowly while walking may cause the in-game rendered character to crouch and walk stealthily, while moving both the above levers far and quickly may cause the in-game character to take a running slide into cover.

Figure 3:
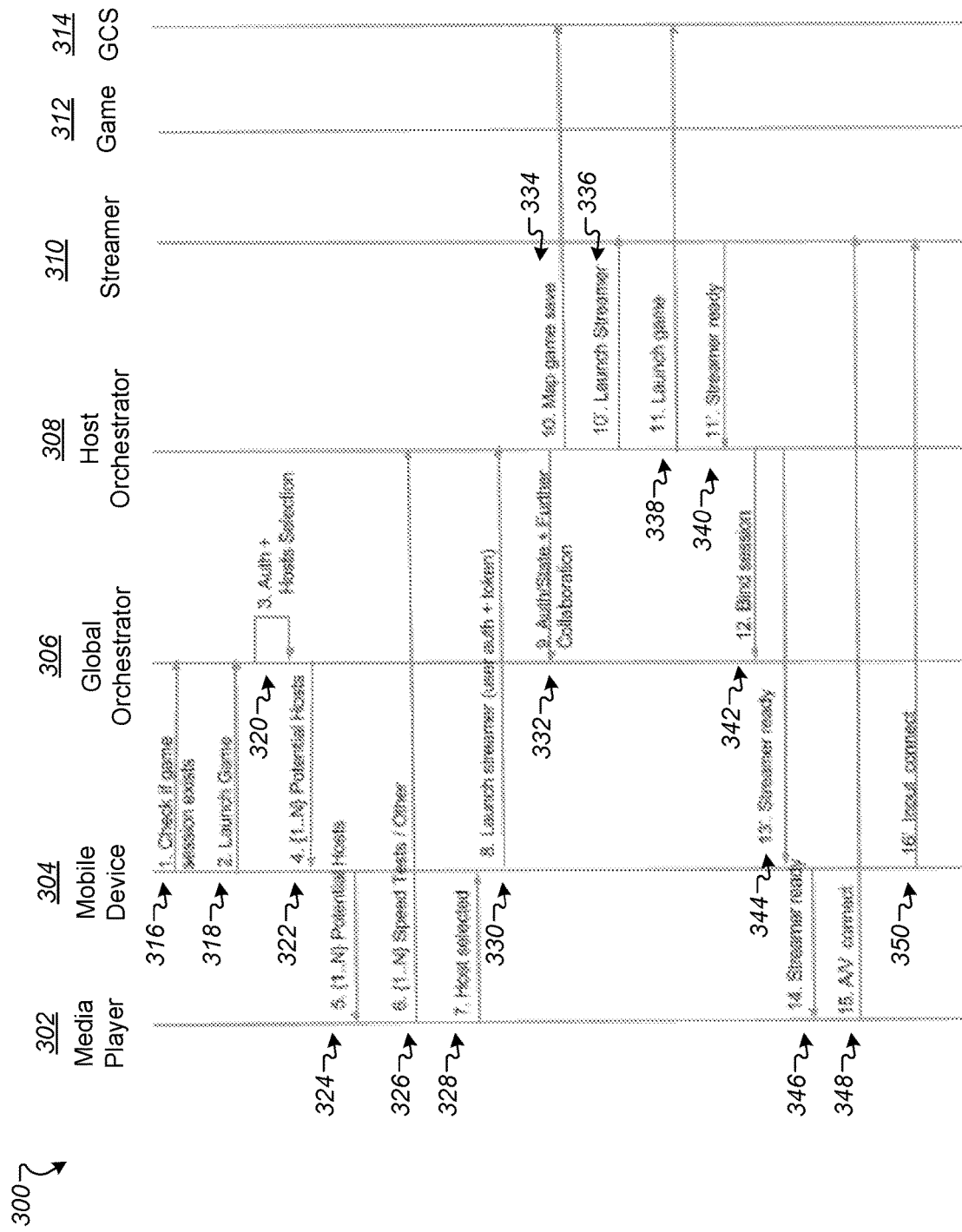
FIG. 3 is a diagram that shows an example configuration sequence that occurs during launch of media content.

FIG. 3 is a diagram that shows an example configuration sequence 300 that occurs during launch of media content. In some implementations, the elements and steps described in sequence 300 may pertain to elements and flows shown in FIG. 1. Other implementations are possible. In general, launch of media content may include communication between a mobile device 102, a controller 122, a server computing device 104, and a media player 106.

As shown, FIG. 3 includes sequences for a media player 302 (e.g., media player 106), a mobile device 304 (e.g., mobile device 102), a global orchestrator 306, a host orchestrator 308 (e.g., host orchestrator 138), a streamer 310 (e.g., streamer 140), a game 312, and a GCS 314. The message flow or sequence 300 may be executed in a system 100, for example, in which the system 100 is asynchronous and non-blocking. At step 316, the mobile device 304 determines whether a game session exists and if the device 304 wishes to launch a game, a game launch request is sent to global orchestrator 306, at step 318.

Upon receiving the game launch request, the global orchestrator 306 verifies user authorization for the game launch, at step 320. For example, the global orchestrator 306 can retrieve user data pertaining mobile device 304 to determine whether the user associated with device 304 is approved to access particular game content.

After user authorization is performed, the global orchestrator 306 can determine which host to select for providing media content and in doing so orchestrator 306 performs a host selection process (also at step 320) based on one or more preconfigured policies. For example, the global orchestrator may select a set of candidate hosts that can be configured to host a game session for the user. In some implementations, host selection is based on geographical distance of the user from a particular service provider, service tower, or other physical provider.

The global orchestrator 306 can send the set of candidate hosts to the mobile device 304, at step 322. The mobile device 304 can select a particular host and/or provide the candidate hosts to media player 302 for selection. For example, the mobile device 304, upon receiving this list of candidate hosts, selects an optimal host based on host selection policies that are currently active. These host selection polices can be associated with a random selector, or based on performance, such as speed tests, throughput potential, quality of service, and/or media-associated provider preference listings, as shown at steps 324. The particular speed tests or other metrics are determined between media player 302 and host orchestrator 308 (i.e., server computing device 104 in FIG. 1), at step 326.

At step 328, the media player 302 selects a host, and notifies mobile device 304 of the selection. At step 330, the mobile device 304 may send a stream launch request to the host orchestrator 308 to request a streaming session. As part of the request, the mobile device 304 may provide a global-orchestrator-issued unique session token and either or both of an obfuscated identifier corresponding to a logged in user and/or a storage token for access to game saves associated with the user.

At step 332, upon receiving the request to begin a streaming session to stream media content, the host orchestrator 308 may verify the session request with the global orchestrator 306. At step 334 and 336, in parallel, the host orchestrator 308 can proceed with launching the streamer 310 (336) and mapping a game save (associated with the user) from cloud storage, for example (334).

At step 340, the host orchestrator 308 may update the game session state at the global orchestrator 306 once a game session is active. The host orchestrator 308 may then bind the session at step 342, and notify the mobile device 304 and media player 302 that the streamer is ready.

Once the streamer is launched (336), the host orchestrator 308 may inform the mobile device 304 (via the global orchestrator 306) to proceed with audio/video connect at step 348 and input connect, at step 350. In parallel, the host launches the game at step 338 once the user's game save(s) (334) are mapped to a virtual machine.

Figure 4:
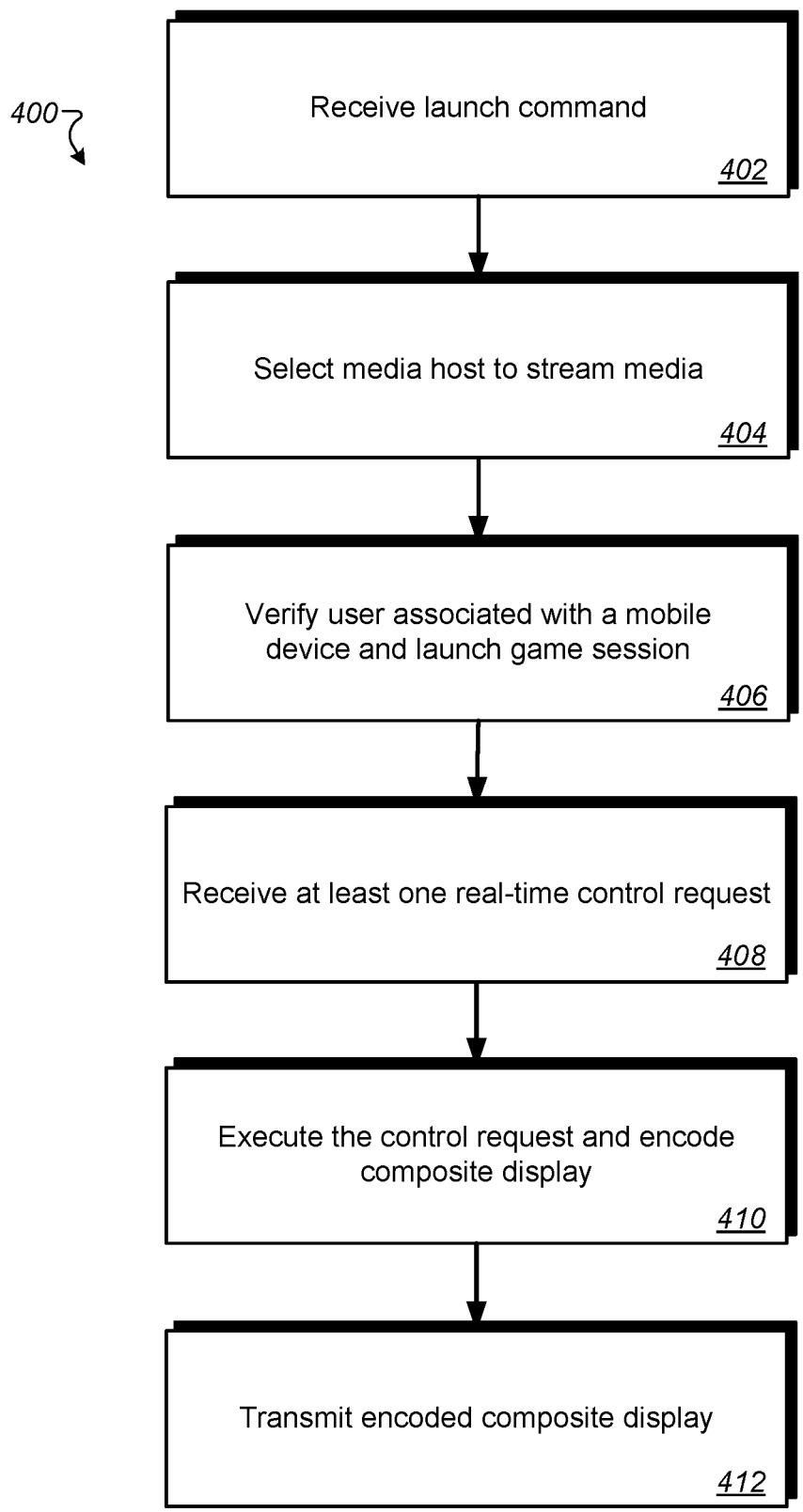
FIG. 4 is a flowchart that illustrates an example process of controlling interactive streaming media.

FIG. 4 is a flowchart that illustrates an example process 400 of controlling interactive streaming media. As shown in FIG. 4, at block 402, a server device receives a launch request to launch and stream media content pertaining to a game session. In some implementations, the launch request may be initiated or provided by a mobile device. For example, the server computing device 104 may receive a launch request from mobile device 102. The launch request may represent a request to stream a gaming session (or other streaming media) to a display device via a media player (e.g., media player 106).

In response to receiving a launch request, the server computing device can select a media host configured to stream the media content, at block 404. The media host may be selected using the information in the launch request and/or other information. For example, the server computing device 104 can select a media host configured to stream particular media content based on a preconfigured location associated with the user of the mobile device 102.

At block 406, the server computing system can verify a user associated with the mobile device. The verification process can include unique session tokens and identifiers corresponding to a particular logged in user or a storage token used for accessing user-associated game saves, for example. Upon verifying the user, the server computing device 104, for example, can launch the game session for streaming to the user on a device other than the mobile device. In some implementations, the device other than the mobile device may be represented by a media player 106 coupled to a display device such as display 124 that can present streaming media content. In some implementations, the device other than the mobile device may be a computing device in communication with one or more servers that can provide streaming media.

Upon launching the game session, the server computing device 104 can, for example, map the game session to a virtual machine associated with content storage for the mobile device. The content storage can be local, remote, cloud-based, or an otherwise configured memory in which the user can store content. The stored game session is a configured communication arrangement that can be used to allow communication between the mobile device and the server computing system regarding the particular game session.

During the game session and while streaming the media content, the server computing device, at block 408, can receive a plurality of real time control requests from the mobile device 102. The real time control requests may be configured to generate at least one change in the media content. For example, one real time control request may be configured to turn a door handle to open a door shown in streaming media content. The instructions in this example may include commands performed by a user with controller 122 and received at mobile device 102. The instructions include machine-readable commands for modifying the streaming media content to depict, to the user on a display (via media player 106), the door handle turning, and the door opening. In this example, the commands may have been input entered by a user associated with the mobile device. The input may have originated at a controller 122 coupled to the mobile device 102, for example.

Upon receiving each control request, the server computing device 104 can, at block 410, execute the control request by compositing, in real time, (a) the at least one change to the media content and (b) the streaming media content to produce a composite display as the change to the media content occurs. In some implementations, the composite display represents a streaming video of the at least one change as the change is executed to the streaming media content. That is, the morphing from the original streaming content to the newly changed video content is shown in real time as it occurs. In this example, the doorknob would turn in the streaming media content and the door would be shown as it was opening. In operation, while executing the control request to open the door, for example, the device 104 can then encode the composite display for transmission to the device other than the mobile device. For example, the composite display can be streamed to the media player 106 for display on display 124. At block 412, the server computing device 104 can transmit, to the device other than the mobile device (e.g., the media player 106 or other computing device), the encoded composite display for streaming in real time.

In some implementations, the received input at the controller 122 may include a partial turn of a radial dial of the controller 122 and the server computing device 104 interprets the partial turn as a scaled back portion of movement. The movement may be in or toward a direction associated with the partial turn of the radial dial. For example, the movement may pertain to a right turn, left turn, deep right turn, shallow left turn, etc. Changing the media content may include displaying, in the streaming media content, a representation of a character in the media content performing a shallow left turn within the media content, for example. In some implementations, the input may include a fast swipe on the controller 122 and the server computing device 104 may interpret the fast swipe as an increased speed for carrying out the change to the media content. In general, a swipe speed can be calculated by dividing the distance the user's finger travels over a controller screen or button divided by the time taken to complete the swipe. The systems described in this disclosure can calculate this based on the type of controller (e.g., button, glass screen, wand controller, etc.) and can cast the movement from the controller into the media content to determine what constitutes fast and slow input. In a non-limiting example, the server 104 (or mobile device 102) can calculate a speed in which to perform an action in the media content based on a finger swipe on a glass screen by calculating the distance of the swipe over the time taken to complete the swipe. Next, the server 104 (or device 102) can determine where the finger swipe begins and ends on the glass (to determine movement over a particular screen size) and can correlate the swipe to the media content to determine how distance equates between the distance covered on the glass and the distance covered in the media content. This may include calculating drag/frictional forces for the glass and accounting for such forces when translating the movement to be performed in the media content.

In some implementations, each game session can be associated with an access port identifier. The access port identifier may identify a user datagram protocol (UDP) input port configured to relay user input between the server computing device 104 and the mobile device 102, for example.

Figure 5:
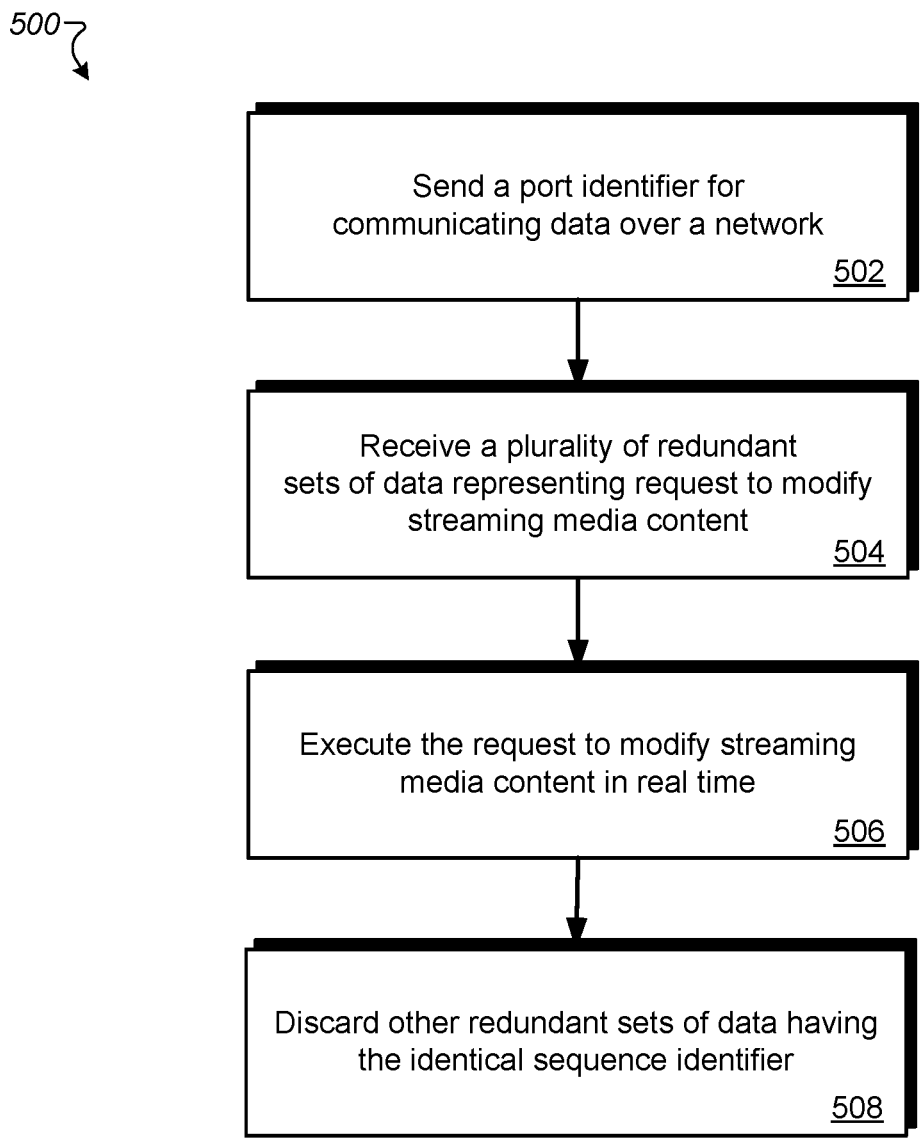
FIG. 5 is a flow chart that illustrates an example process of a transport protocol between a mobile device and a server computing device.

FIG. 5 is a flow chart that illustrates an example process 500 of a transport protocol between a mobile device and a server computing device. In short, the process 500 may be used to ensure that user inputted data is received at a server computing device when sent from a mobile device coupled to a controller that provides the inputted data.

At block 502, and in response to receiving a streaming session request from a mobile device, the process 500 may include sending, from a server computing device 104 to a mobile device 102, a port identifier for communicating data over a network (e.g., the Internet). Such a network may be configured to enable streamed communication amongst one or more server computing systems, mobile devices, and media players associated with the mobile devices. The port identifier may include a UDP input port to use with the network when relaying user input to the server computing device 104, for example.

At block 504, the process 500 may include receiving, at the server computing device 104, a plurality of redundant sets of data representing a request to modify streaming media content. Each set of data may be identified by an identical sequence identifier. The sets of data may be identical and identified as such to ensure redundant sets of commands can be sent to account for any packet dropping or network errors that could cause command data to fail delivery.

At block 506, the process 500 may include executing the request to modify streaming media content in real time and notifying the mobile device about the execution. In particular, modifying the streaming media content may include executing an input command (e.g., fire weapon at door) received from a mobile device 102 in the streaming media content. The execution may include carrying out the firing of the weapon at a door in the streaming media content and providing streams of images of that execution by compositing, in real time, the at least one change (e.g., show weapon firing and bullet holes in the door) into the media content to produce a composite display. The composite display can be encoded and transmitted to a device other than the mobile device (e.g., media player 106). The display can occur at real time upon receiving the request to modify streaming media content (i.e., receiving the input command to fire the weapon at the door).

At block 508, the process 500 can include discarding any other redundant sets of data having the identical sequence identifier. For example, after the requests/commands are carried out and/or ensured to be captured, any redundant data (identified as redundant by the sequence identifier) can be expunged from the server computing device to ensure that stale keystrokes are not carried out.

In some implementations, the process 500 can determine that particular requests/commands were not received at the server computing device 104. In response to determining that the redundant sets of data were not received at the server computing device 104, the server computing system 104 can transmit a reset protocol to prevent replay of commands associated with the redundant sets of data.

In some implementations, a portion of a plurality of real time control requests may include at least two requests to modify content in the streaming media content, and each request can include redundant information identified by a sequence identifier, the redundant information including a fixed number of sets of packets per received real time control request. That is, redundancy can be built into the command send and receive structure to ensure that commands are properly received at server computing device 104 and carried out accordingly. In some implementations, redundant packets of the same data can be sent from the mobile device 102 to the server computing device 104. For example, redundant information that includes about 15 to about 20 sets of identical packets for each real time control request may be sent to the server computing device 104.

Figure 6:
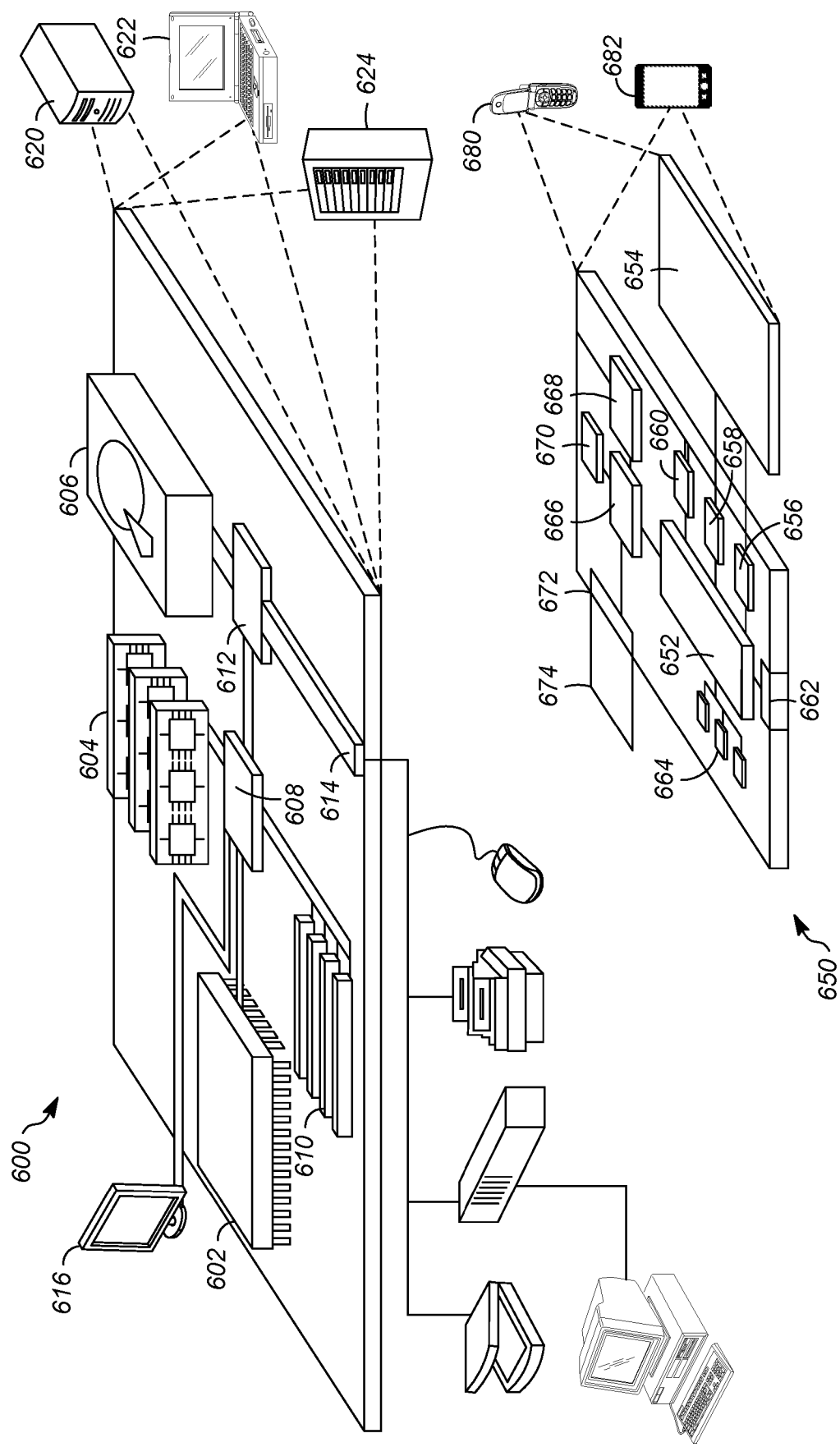
FIG. 6 shows an example of a computer device and a mobile computer device that can be used to implement the techniques described in this disclosure.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. In addition, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server computing device 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and can interact through a communication network. The relationship of client and server arises by virtue of computer programs running on the respective computers and having a client-server relationship to each other.

The computing system can include clients and servers. A client and server are generally remote from each other and can interact through a communication network. The relationship of client and server arises by virtue of computer programs running on the respective computers and having a client-server relationship to each other.

In situations in which the systems and methods discussed herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system comprising:
 a mobile device configured to:
  wirelessly connect to an input device;
  select at least one content server computing device to host a streaming session with a video decoding device coupled to a display device that displays interactive media content streamed from the at least one content server computing device;
  establish a streaming session with the at least one content server computing device;
  receive input initiated by, and transmitted remotely from the input device, the input including instructions to control the interactive media content provided by the at least one content server computing device;

generate, based on the received input, a representation of the input; and relaying, to the at least one content server computing device, the generated representation of the input, wherein the generated representation of the input includes at least one redundant packet that replicates the received input, the at least one redundant packet including a sequence identifier such that the at least one redundant packet having the sequence identifier is configured to be discarded, wherein the representation of the input is used to control the interactive media content that is streamed to the video decoding device, the mobile device not being the video decoding device.

2. The system of claim 1, wherein controlling the interactive media content comprises:

causing execution of the input, received from the mobile device, on streaming media content by triggering execution, in real time, of at least one change to the interactive media content to produce a composite display;

causing encoding of the composite display; and causing transmission of the encoded composite display to the video decoding device.

3. The system of claim 1, wherein the input device is a second mobile device.

4. The system of claim 1, wherein the mobile device is further configured to:

transmit a reset protocol to prevent replay of commands associated with the at least one redundant packet, in response to determining that the at least one redundant packet was not received by the at least one content server computing device.

5. A computer-implemented method comprising:

causing, at a mobile device, an input device to wirelessly connect to the mobile device;

selecting, by the mobile device, at least one content server computing device to host a streaming session with a video decoding device coupled to a display device that displays interactive media content streamed from the at least one content server computing device;

initiating, by the mobile device, a streaming session with the at least one content server computing device;

receiving, at the mobile device, input initiated by, and transmitted remotely from the input device, the input including instructions to control the interactive media content provided by the at least one content server computing device;

generating, by the mobile device and based on the received input, a representation of the input; and relaying, from the mobile device and to the at least one content server computing device, the generated representation of the input, wherein the generated representation of the input includes at least one redundant packet that replicates the received input, the at least one redundant packet including a sequence identifier such that the at least one redundant packet having the sequence identifier is configured to be discarded, wherein the representation of the input is used to control the interactive media content that is streamed to the video decoding device, the mobile device not being the video decoding device.

6. The computer-implemented method of claim 5, wherein controlling the interactive media content comprises:

causing execution of the input, received from the mobile device, on streaming media content by triggering execution, in real time, of at least one change to the interactive media content to produce a composite display;

causing encoding of the composite display; and causing transmission of the encoded composite display for streaming in real time to the video decoding device.

7. The computer-implemented method of claim 5, wherein the input device is a second mobile device.

8. The computer-implemented method of claim 5, wherein the mobile device is further configured to:

transmit a reset protocol to prevent replay of commands associated with the at least one redundant packet, in response to determining that the at least one redundant packet was not received by the at least one content server computing device.

9. A computer program product tangibly embodied on a non-transitory computer-readable medium and comprising instructions that, when executed, are configured to cause at least one processor to execute operations comprising:

cause, at a mobile device, an input device to wirelessly connect to the mobile device;

select, by the mobile device, at least one content server computing device to host a streaming session with a video decoding device coupled to a display device that displays interactive media content streamed from the at least one content server computing device;

initiate, by the mobile device, a streaming session with the at least one content server computing device;

receive, at the mobile device, input initiated by, and transmitted remotely from the input device, the input including instructions to control the interactive media content provided by the at least one content server computing device;

generate, by the mobile device and based on the received input, a representation of the input; and relay, from the mobile device and to the at least one content server computing device, the generated representation of the input, wherein the generated representation of the input includes at least one redundant packet that replicates the received input, the at least one redundant packet including a sequence identifier such that the at least one redundant packet having the sequence identifier is configured to be discarded, wherein the representation of the input is used to control the interactive media content that is streamed to the video decoding device, the mobile device not being the video decoding device.

10. The computer program product of claim 9, wherein the operations comprise:

causing execution of the input, received from the mobile device, on streaming media content by triggering execution, in real time, of at least one change to the interactive media content to produce a composite display;

causing encoding of the composite display; and causing transmission of the encoded composite display for streaming in real time to the video decoding device.

11. The computer program product of claim 9, wherein the input device is a second mobile device.

12. The computer program product of claim 9, wherein the operations comprise:

transmit a reset protocol to prevent replay of commands associated with the at least one redundant packet, in response to determining that the at least one redundant packet was not received by at least one content server computing device.

* * * * *